United States Patent [19]

Mori et al.

[11] Patent Number: 5,488,645
[45] Date of Patent: Jan. 30, 1996

[54] CLOCK SIGNAL GENERATING DEVICE

[75] Inventors: Kenichi Mori; Shotaro Yokoyama, both of Nagano, Japan

[73] Assignee: Fuji Electric Co., Ltd., Kawasaki, Japan

[21] Appl. No.: 402,030

[22] Filed: Mar. 10, 1995

[30] Foreign Application Priority Data

Mar. 10, 1994 [JP] Japan ..................................... 6-038926

[51] Int. Cl.[6] .............................. H03K 3/02; H03K 21/40
[52] U.S. Cl. ............................. 377/20; 382/317; 327/160
[58] Field of Search .............................. 377/20; 327/151, 327/160; 382/317

[56] References Cited

U.S. PATENT DOCUMENTS

| 4,514,835 | 4/1985 | Bottigheimer et al. | 377/20 |
|---|---|---|---|
| 4,702,595 | 10/1987 | Mutschler et al. | 382/317 |
| 5,291,534 | 3/1994 | Sakurai et al. | 377/20 |
| 5,343,085 | 8/1994 | Fujimoro et al. | 377/20 |

FOREIGN PATENT DOCUMENTS 1-119118  5/1989  Japan .

Primary Examiner—John S. Heyman
Attorney, Agent, or Firm—Brumbaugh, Graves, Donohue & Raymond

[57] ABSTRACT

For correction of an error caused in a period of a clock signal for digitizing a plurality of time signals, e.g., from an image sensor, a clock signal generating device generates a reference signal Sr indicative of a reference time of time signals TS from an OR-date (20). The device counts a reference clock signal $\phi$ in a frequency divider (30) until the reference signal Sr is generated, and outputs a divided clock signal $\phi_n$ with frequency dividing ratio 1/N from the frequency divider (30). It then counts the signal $\phi_n$ and stores the count value as a reference value S in a reference value counter (40). The device outputs an output clock signal $\phi_o$ from an output counter (50) each time the signal $\phi$ received after generation of the signal Sr reaches a predetermined value. It accumulates in an accumulator (60) the count value of the frequency divider (30) at the time of generation of the signal Sr in response to the signal $\phi_o$, and it sets a reference value of the counter (50) for counting the signal $\phi$, to generate the signal $\phi_o$ usually at S, and at 1+S when an accumulated value in the accumulator (60) reaches the parameter N of the frequency dividing ratio.

12 Claims, 2 Drawing Sheets

CLOCK SIGNAL GENERATING DEVICE

BACKGROUND OF THE INVENTION

The present invention relates to a clock signal generating device or apparatus for generating a clock signal for chopping the duration represented by each of a plurality of time signals, to convert the durations to digital data. The device can be used, e.g., for reading out image data from charge-storage-type image sensors.

For converting the duration of various events to digital data, it is convenient to chop the duration with a clock signal of appropriate frequency and to count the number of repetitions of chopping. In this well-known technique, a time signal which represents the duration of an event is used. It is convenient to represent the duration of an event by a period of time during which the time signal maintains a logic state "HIGH" or "LOW". In converting the duration to time data, the frequency of the clock signal for chopping the duration should be selected. When there are several events, it is recommended to select an appropriate time period from the durations of the events and to determine the clock signal frequency based on the selected time period. FIG. 4 is a circuit block diagram of a prior-art clock signal generating device as disclosed in Japanese Patent Document No. H01-119118.

In FIG. 4, an OR-gate 20 receives a plurality of time signals TS. The time signals TS indicate with a logic state "LOW" the durations of simultaneous events. The OR-gate 20 outputs a reference signal Sr of "HIGH" at a time corresponding to the shortest of the durations. A frequency divider 30 receives a reference clock signal $\phi$ and outputs a divided clock signal $\phi_n$ the frequency of which is 1/N times the reference clock signal frequency. In the following, N is referred to as "frequency dividing parameter" and 1/N as "frequency dividing ratio".

The frequency dividing ratio 1/N is set at a value suitable for finding as accurately as possible a reference time period for the durations of the simultaneous events. The divided clock signal $\phi_N$ is fed to a counter 40 via an OR-gate 41 which also receives the reference signal Sr output from the OR-gate 20. The OR-gate 41 is enabled by "LOW" of the signal Sr, until the signal Sr turns to "HIGH". Thus, the counter 40 is reset as soon as an event occurs, and starts counting the divided clock signal $\phi_N$. The counter 40 stops counting the divided clock signal $\phi_N$ when the OR-gate 41 is disabled by "HIGH" of the reference signal Sr. The duration from the start of the event until the generation of the reference signal Sr is denoted by SNT, with a count value S of the counter 40 at the time of its stopping and a period T of the reference clock signal $\phi$. The duration SNT is used as a reference time Tr for measuring the duration of a plurality of events.

An output counter 50 is a programmable counter for outputting an output clock signal $\phi_O$. The output counter 50 starts receiving the reference clock signal $\phi$ via an AND-gate 51 as soon as the reference signal Sr is generated (i.e., as soon as the reference signal Sr turns to "HIGH") and outputs from its last stage the output clock signal $\phi_O$ as a carry via an OR-gate 52. Since the output of the OR-gate 20 is "LOW" before the reference signal Sr is generated, the OR-gate 52 receives a "HIGH" signal from an inverter 21 and outputs a "HIGH" signal to a program input port PR of the output counter 50. Thus, the output counter 50 is programmed or initialized at the count value S of the counter 40 as soon as the reference signal Sr is generated. And, at the same time when the reference signal Sr is generated, the AND-gate 51 is enabled by "HIGH" of the reference signal Sr, and the OR-gate 52 is enabled by "LOW" of a complementary signal of the reference signal Sr via the inverter 21.

The output counter 50 then outputs the carry in the form of the output clock signal $\phi_O$ from its last stage via OR-gate 52 when the output counter 50 has received the pulses of the reference clock signal $\phi$ corresponding to its initial set value S via the OR-gate 51. At the same time, the output counter 50 returns to its program input port PR "HIGH" of the output clock signal $\phi_O$ so as to be initialized again. The output counter 50 repeats the same operation and outputs the output clock signal $\phi_O$ each time the output counter 50 receives the reference clock signal pulses corresponding to its initial set value S. At the initial and the following initialization steps, complementary signals of the output from output stages Q0 to Qn of the counter 40 are input to corresponding data input ports D0 to Dn of the output counter 50.

The OR-gate 20 detects the reference time Tr as a measure for the duration of events represented by a plurality of time signals TS, and outputs the reference signal Sr. The output counter 50 outputs the output clock signal $\phi_O$ or chopping the duration of the events at every number of pulses of the reference clock signal $\phi$ corresponding to the count value S of the counter 40 when the reference signal Sr is generated. The period of the output clock signal $\phi_O$ is the same as that of the reference clock signal $\phi$ when S is zero. Usually, the period of the output clock signal $\phi_O$ is S+1 times the period of the reference clock signal $\phi$.

Though the output clock signal $\phi_O$ output at a frequency corresponding to the reference time Tr may be used as is for chopping the time represented by each time signal TS, a clock signal obtained by appropriately dividing the output clock signal $\phi_O$ is usually adopted for chopping the durations. When the period of time represented by the time signal TS varies in a wide range, it is desirable to generate a clock signal whose period varies with elapse of time for chopping the variable durations.

The reference time Tr is determined based on the count value S at the time of generation of the reference signal from the counter 40 which receives the clock signal $\phi_O$ obtained by dividing the reference clock signal $\phi$. As a result, a time fraction is dropped for the sake of convenience as the period of the divided clock signal $\phi_N$ is an aliquot part of the reference time Tr. An error caused by this dropping of a fractional part is the larger, the closer the dropped part is to the period of the divided clock signal $\phi_N$. Since the reference time Tr is expressed as Tr=SNT, with the period T of the reference clock signal $\phi$ and the frequency dividing parameter N of the divided clock signal $\phi_N$, the error becomes larger with increasing N, and a relative error becomes larger with a decreasing count value S.

The clock signal for chopping the duration of the events is generated from the output clock signal $\phi_O$, whose period corresponds to the reference time Tr. As a result, the duration is chopped and digitized by the clock signal with an inappropriate period when the error of the reference time Tr is large. As a result, the accuracy of the digital data is impaired. Although the error may be reduced by setting the dividing parameter N at a small value, a small N-value is not suitable for digitizing durations which vary over a wide range. Since a small count value S may be caused by a short reference time even when the frequency dividing ratio is set properly, an error is inevitable.

SUMMARY OF THE INVENTION

It is an object of the present invention to provide a clock signal generating device which more accurately generates an output clock signal based on an actual reference time.

A preferred clock signal generating device, for generating a clock signal for chopping periods of time represented by a plurality of time signals, comprises a reference time detecting means for detecting a reference time from the time signals and for outputting a reference signal, a frequency divide-and-counting means for counting a reference clock signal until the reference signal is generated and for outputting a divided clock signal obtained by dividing the reference clock signal with a predetermined frequency dividing ratio, a reference value counting means for counting the divided clock signal and for storing a count value of the divided clock signal as a reference value, an output counting means for receiving the reference clock signal after the reference signal is generated, counting the received reference clock signal, and for generating an output clock signal each time a count value of the received reference clock signal reaches a set value, an accumulating means for accumulating each time the output clock signal is generated a count value of the reference clock signal of the frequency divide-and-counting means at a time of generation of the reference signal, and a set value renewing means for renewing the set value of the output counting means to the set reference value stored in the reference value counting means each time the output clock signal is generated, and for renewing the set value of the output counting means to a value obtained by adding 1 to a multiple of a set parameter of the frequency dividing ratio only when an accumulated value of the accumulating means reaches the multiple of the set parameter.

When such a clock signal generating device is included for read-out from a suitable image sensor, e.g., from a charge-storage-type sensor, a preferred image read-out device is obtained.

DETAILED DESCRIPTION OF PREFERRED EMBODIMENTS

Figure 1:
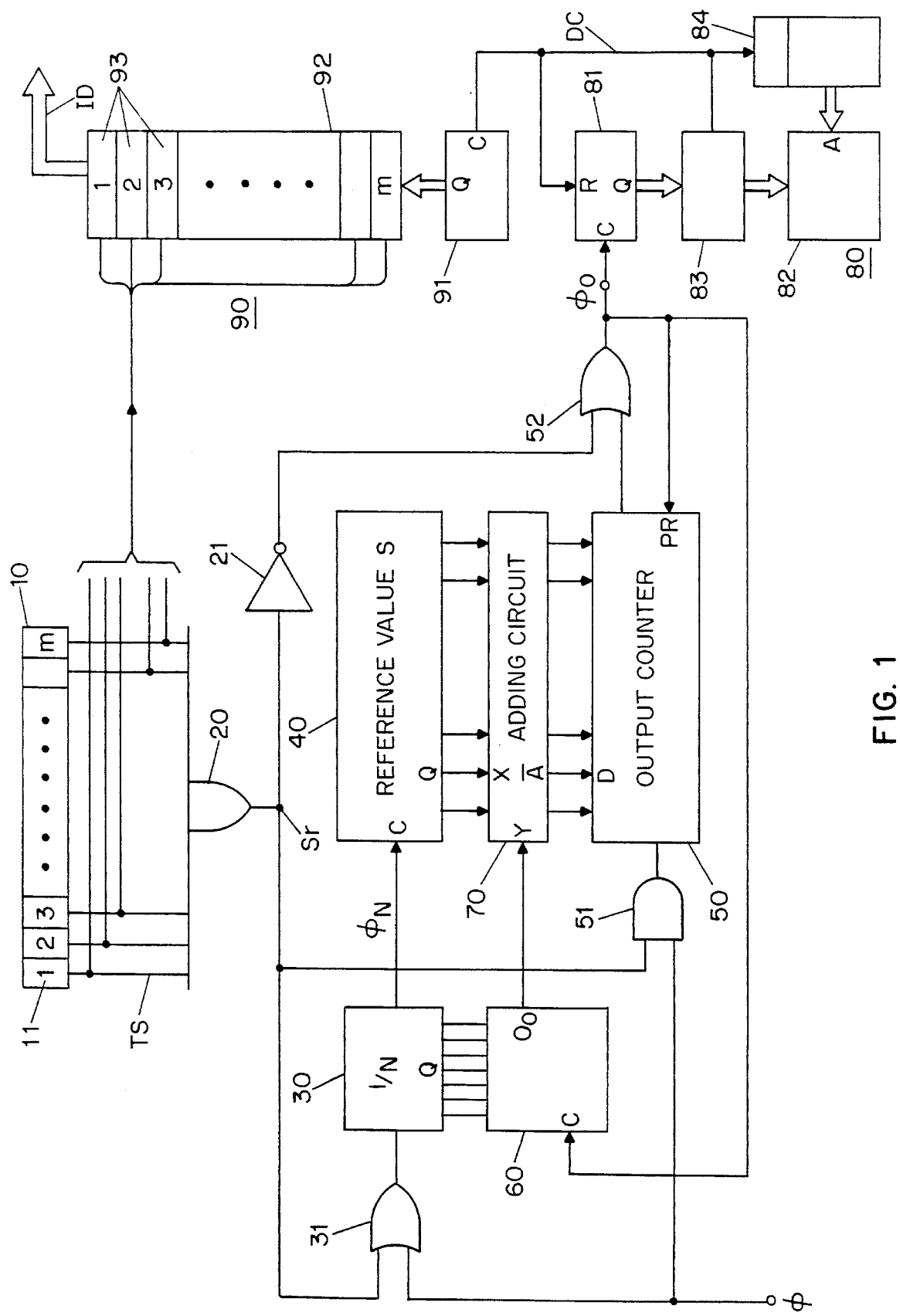
FIG. 1 is a circuit block diagram showing a preferred embodiment of a clock signal generating device according to the present invention together with pertinent annexed circuits in an image read-out device.

Conveniently, the reference time detecting means is made with a logic gate such as an OR-gate or the like, detecting a shortest period indicated by the time signals. It is advantageous to use a programmable counter for the output counting means. While a conventional frequency divider may be used for the frequency divide-and-counting means, here the frequency divide-and-counting means also counts the reference clock signal.

An accumulating means preferably comprises flip-flops, one each for storing each bit of the accumulated value, and adders, one each for each bit of the accumulated value, for receiving the stored accumulated value and the count value of the frequency divide-and-counting means. Each adder feeds its carry output to the next-following adder.

A set value renewing means preferably comprises an adding circuit operated by output of the accumulating means which adds 1 to the reference value of the reference value counting means and feeds the result of the addition to the output counting means. Also, it is preferred to feed a reference clock signal both to the output counting means and to the frequency divide-and-counting means.

In a preferred embodiment, the clock signal generating device stores a fraction of the reference time, i.e., an excess or remainder which can not be divided by the period of the divided clock signal, in the frequency divide-and-counting means each time the reference signal is generated. The accumulating means accumulates the stored fractions each time the output clock signal is generated. Error correction is carried out each time the accumulated fraction reaches the set frequency dividing ratio, by temporarily expanding the output clock signal. Thus, the generated output clock signal is accurately based on the actual reference time.

By utilizing the counting function inherent to the frequency divide-and-counting means, the clock signal generating device stops feeding the reference clock signal to the frequency divide-and-counting means memories when the reference clock signal is generated, and stores a count value corresponding to the time fraction at the time of feed interruption of the reference clock signal. The accumulating means accumulates the count value of the frequency divide-and-counting means each time the output clock signal is generated from the output counting means.

The accumulated value of the accumulating means indicates that the error due to the time fraction accumulates with repeated generation of the output clock signal. The set parameter of the frequency divide-and-counting means corresponds to a unit count value of the reference value counting means. The set value renewing means initializes the set value of the output counter at a value obtained by temporarily adding 1 to the reference value of the reference value counting means each time the accumulated time fraction reaches the set frequency dividing parameter. Thus, the error is corrected and prevented from accumulating, by delaying the next generation of an output clock signal by one cycle of the reference clock signal. It is sufficient to provide the accumulating means with a storage capacity just large enough to store an accumulated time fraction which is less than the set frequency dividing parameter, and to add 1 to the initial set value of the output counting means.

Error correction is carried out only when the accumulated time fraction reaches a multiple of the set frequency dividing parameter. This is sufficient to prevent the reference time fractions from accumulating as the output clock signal is generated repeatedly from the output counting means.

Figure 4:
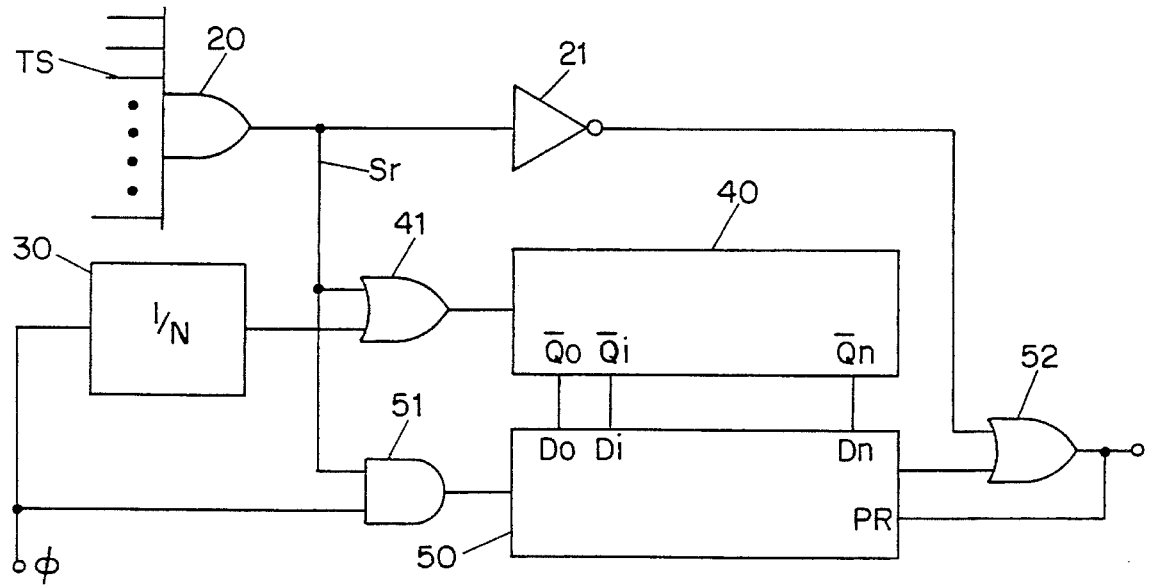
FIG. 4 is a circuit block diagram of a prior-art clock signal generating device.

In a particular, exemplary embodiment of the invention as illustrated by FIG. 1, time signals to be chopped by an output clock signal represent charge storage periods of time corresponding to light intensity received by optical sensors. In FIG. 1, parts which are like those of FIG. 4 are designated by the same reference numerals.

An image sensor 10 shown in an upper part of FIG. 1 comprises m optical sensors 11, e.g., charge storage type photodiodes. The optical sensors 11 output time signals TS indicative of charge storage time periods. In this embodiment, the time signals TS represent the charge storage periods of the optical sensors 11 by logic state "LOW" after the image sensor 10 is reset. An OR-gate 20 for detecting a reference time Tr as in FIG. 4 receives m time signals TS and generates a reference signal Sr having logic state "HIGH" at a time corresponding to the shortest charge storage period.

A frequency dividing counter 30 divides the frequency of a reference clock signal $\phi$ by N and obtains a divided clock signal $\phi_N$ the frequency of which is 1/N times the frequency of the reference clock signal $\phi$. The frequency dividing counter 30 is also used as a counter of the reference clock signal $\phi$. To facilitate this, the reference clock signal $\phi$ and the output of the reference time detector (OR-gate) 20 are fed to an OR-gate 31, and the reference clock signal $\phi$ is fed to the frequency dividing counter 30 via the enabled OR-gate 31 until the reference signal Sr is generated, so that the frequency dividing counter 30 performs frequency dividing and counting operations. Once the reference signal Sr is generated, the OR-gate 31 is disabled. The disabled OR-gate 31 stops feeding the reference clock signal $\phi$, and the frequency dividing counter 30 stops outputting the divided clock signal $\phi_N$ and latches the count value of the reference clock signal $\phi$ at the value at which the reference signal Sr is generated. For example, when the frequency dividing parameter N is set at $2^7=128$ in the dividing counter 30, the frequency dividing counter 30 stores seven-bit data of the count value of the reference clock signal $\phi$.

As in the prior art, a reference value counter 40 counts the divided clock signal $\phi_N$. However, in the present embodiment the reference value counter 40 stores a count value S of the divided clock signal $\phi_N$, counted until the frequency dividing counter 30 stops its counting operation. The count value S is obtained by dividing the above-described reference time Tr by a period NT of the divided clock signal $\phi_N$. The period NT of the divided clock signal $\phi_N$ is determined by the set frequency dividing parameter N and a period T of the reference clock signal $\phi$. In most cases, NT is an aliquot part of the reference time Tr. The reference time Tr is represented as Tr=SNT +Ts, where Ts is a fraction, excess or remainder of the division. By using the stored value s of the frequency dividing counter 30, the fraction Ts is expressed as Ts=s·T, where s<N.

A programmable counter can serve as output counter 50. An AND-gate 51 is disposed on the input side of the output counter 50, and an OR-gate 52 on the output side. The AND-gate 51 and the OR-gate 52 are enabled after the reference signal Sr is generated. The output counter 50 is initialized at the reference value S of the reference value counter 40, except when a correction is made in relation to a time fraction Ts. The output counter 50 outputs an output clock signal $\phi_O$ from its last stage via the OR-gate 52 each time the count value of the reference clock signal $\phi$, input to the first stage via the AND-gate 51, reaches the initial set value. At the same time, the output counter 50 is initialized again by "HIGH" of the output clock signal $\phi_O$ input to its program input port PR, and then repeats the same operation. Although the periods of the reference clock signals fed to the frequency dividing counter 30 and the output counter 50 may be selected independently, it is convenient to feed a common reference clock signal $\phi$ to the counters 30 and 50.

An accumulator 60 accumulates the above-described stored value s of the frequency dividing counter 30 each time the output clock signal $\phi_O$ is input from the output counter 50. The accumulator 60 receives seven Q's from the output stage of the frequency dividing counter 30 whose frequency dividing parameter N is set at 128 in this example.

Figure 2:
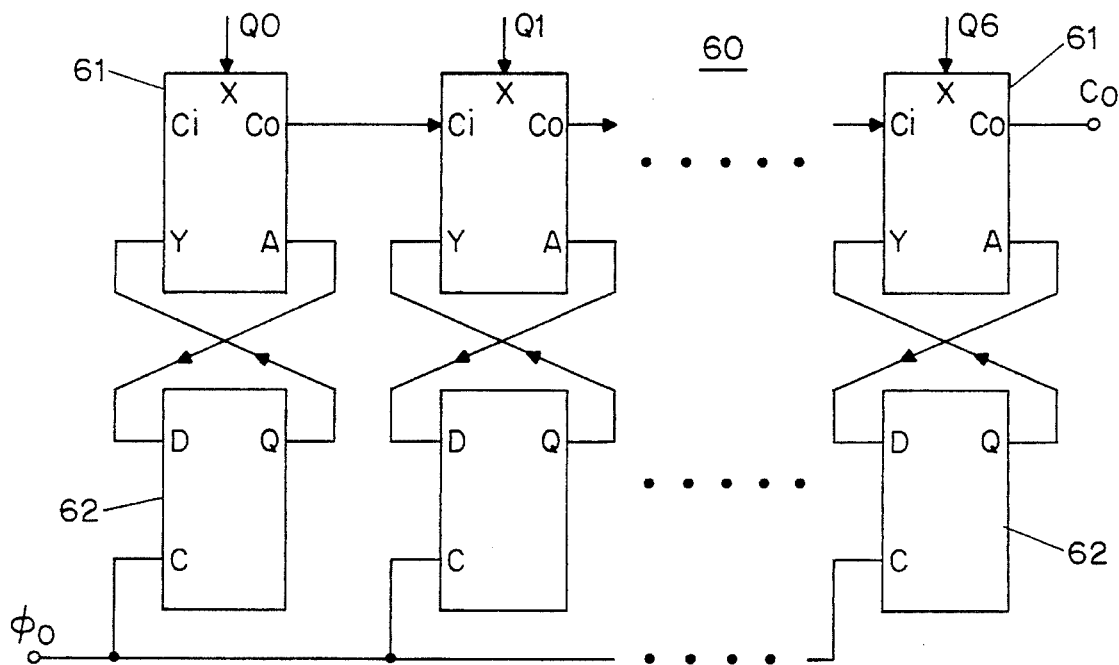
FIG. 2 is a circuit diagram showing a configuration of an accumulator of the clock signal generating device of FIG. 1.

Each of seven adders 61 shown in the upper part of FIG. 2 corresponds to one of the seven bits. Each adder 61 receives addition inputs X, Y, and carry input $c_i$ from its preceding adder (preceding bit) and calculates $X+Y+c_i=A+c_O$. The adder 61 outputs addition output A of its bit and a carry $c_O$ for its next-following adder. The adders 61 are interconnected for each adder to receive the corresponding one of the outputs Q0 through Q6 from the frequency dividing counter 30 at its X input port, and output the carry $c_O$ to a carry input port $c_i$ of its next-following adder.

Each of seven D-type flip flops 62, disposed corresponding to each of the adders 61, stores each bit of an accumulated value. Each flip flop 62 is connected with its corresponding adder 61 so that the flip flop 62 receives at its D-input port the addition output A from the corresponding adder 61, feeds its Q output to a Y input port of the corresponding adder 61, and receives commonly the output clock signal $\phi_O$ at its clock input port C. When each flip flop 62 receives the output clock signal $\phi_O$, the flip flop 62 reads in from the D-input port the addition output A indicative of an accumulated value from the corresponding adder 61 on the rising edge of the output clock signal $\phi_O$. Then, the flip flop 62 feeds from the Q-output port the additionally read output A to the Y input port of the corresponding adder 61 on the falling edge of the output clock signal $\phi_O$. Each adder 61 adds the input addition output A and the stored value s input from the frequency dividing counter 30, and renews the accumulated value.

As described above, the accumulator 60 renews the stored value s of the frequency dividing counter 30 each time the accumulator 60 receives the output clock signal $\phi_O$. When the renewed accumulated value reaches or exceeds the set frequency dividing parameter N, the carry $c_O$ indicating so is output without exception from the adder 61 of the uppermost bit. The carry $c_O$ is fed to an adding circuit 70 described below as carry output Co. If necessary, the carry output $C_o$ may be provided with predetermined pulse width, e.g., by an one-shot circuit.

The adding circuit 70 receives the carry output Co from the accumulator 60 and initially sets a value obtained by adding 1 to the stored value S of the reference value counter 40 to the output counter 50. The adding circuit 70 receives the stored value S at its X-input ports and the carry output Co at its Y-input port, and feeds a complement of the addition output A to the output counter 50.

Figure 3:
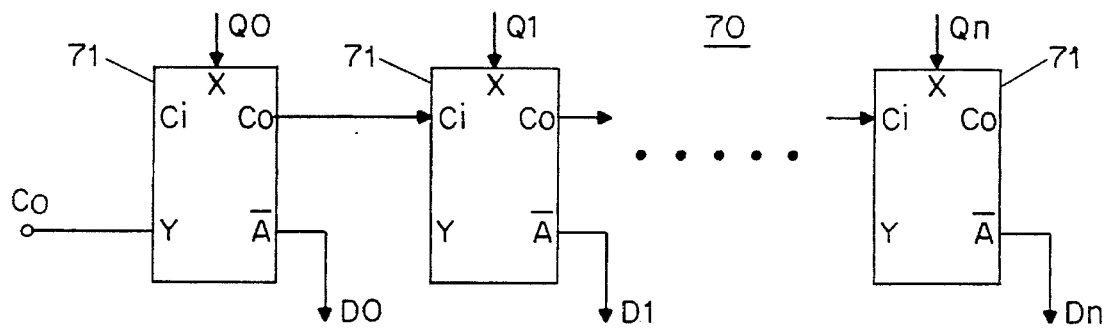
FIG. 3 is a circuit diagram showing a configuration of an adding circuit which adds 1 to a set value of an output counter of the clock signal generating device of FIG. 1.

FIG. 3 shows an adding circuit 70 including the same number of adders 71 as the number of stages of the reference counter 40. The adders 71 have a structure similar to the adders 61. The adders 71 are interconnected as in FIG. 2, for each adder to receive the corresponding one of the outputs Q0 through Q6 from the reference value counter 40 at its X-input port, and to output the carry output $c_O$ to a carry input port $c_i$ of its next-following adder. Only the adder 71 of the lowest bit receives the carry output Co of the accumulator 60. Each adder 71 feeds a complementary signal of the addition output A of the corresponding bit to the corresponding one of data input ports D0 to DN of the output counter 50. With the adding circuit 70 thus configured, the output counter 50 is usually initialized at the count value S of the reference value counter 40 each time the output clock signal $\phi_O$ is output. The output counter 50 is initialized at a value S+1 when the accumulated value of the accumulator 60 reaches the set frequency dividing parameter N of the frequency dividing counter 30.

As described, the present clock signal generating device stores the time fraction Ts of the reference time Tr in the form of count value s of the frequency dividing counter 30 when the reference signal Sr is generated. The value s is stored in the accumulator 60 each time the output clock signal $\phi_O$ is generated. The output counter 50 is initialized at a value obtained by adding 1 to the reference value S of the reference value counter 40 when the accumulated value of the accumulator 60 reaches the set frequency dividing parameter N. Thus, the clock signal generating device corrects the error caused by the time fraction Ts by delaying the next generation of the output clock signal $\phi_O$ by one cycle of the reference clock signal $\phi$, and prevents error from accumulating with repeated generation of the output clock signal $\phi_O$.

FIG. 1 also shows a circuit which chops the time periods represented by time signals TS with the output clock signal $\phi_O$ and digitizes the periods. A quantize clock 80 generates a quantize clock signal DC, the period of which varies with elapse of time, for chopping the periods represented by the time signals TS. The quantize clock 80 includes a counter 81 which counts the output clock signal $\phi_O$, a ROM 82 which commands the period of the quantize clock signal DC, a comparator 83 which compares a count value of the counter 81 with the command value of the ROM 82, and an address counter 84 for the ROM 82. The quantize clock 80 reads out a comparison output from the comparator 83 as the quantize clock signal DC, it counts the quantize clock signal DC in the address counter 84, and, by the quantize clock signal DC, it resets the count value of the counter 81 to zero.

The address counter 84 counts the received quantize clock signal DC and feeds its count value, from which some lower bits are omitted, to the ROM 82 as an address command. Thus, the quantize clock 80 changes the period of the quantize clock signal DC with elapse of time by changing a command value output from the ROM 82 after the quantize clock signal DC is generated with a predetermined number of pulses.

As illustrated in FIG. 1, a quantize circuit 90 chops the periods represented by a time signal TS by the quantize clock signal DC output from the address counter 84, and digitizes the time signal TS. The quantize circuit 90 includes a counter 91 which counts the quantize clock signal DC, and a quantizer which includes m latches 93 which receive the time signals TS from the optical sensors 11 of the image sensor 10. The latches 93 receive the time signals TS in common. When the charge storage periods of the optical sensors 11 are over, the time signals TS are switched from "LOW" to "HIGH". When the latches 93 receive "HIGH" of the time signals TS as a latch command, the latches 93 read out the count values of the counter 91 and store these values as the data representing the charge storage periods.

A data bus is connected to each of the latches 93 for reading out the stored data from the quantizer 92. The data stored in the latches 93 is read out as image data ID through the data bus by feeding output commands one by one to the latches 93 from an addresser (not shown). By lengthening the period of the quantize clock signal DC with elapse of time by the ROM 82, the charge storage periods can be accurately distinguished from each other even when the charge storage periods are distributed over a wide range and converted to relatively short data, e.g., of eight bits.

As described, the clock signal generating device of the present invention obtains a reference signal by detecting a reference time from a plurality of time signals, counts a reference clock signal within the reference time with a frequency dividing counter and outputs a divided clock signal, counts the divided clock signal and stores a counted value of the divided clock signal as a reference value in a reference value counter, generates an output clock signal from an output counter each time a count value of the reference clock signal after the reference signal generation reaches a initial set value, accumulates a count value of the frequency dividing counter in an accumulator each time the output clock signal is generated, adds 1 to the reference value of the reference value counter to generate a new reference value when an accumulated value of the accumulator reaches a multiple of the set frequency dividing parameter of the frequency dividing counter, and initializes the output counter at the new reference value. Effects realized by a preferred clock signal generating device in accordance with the invention include:

(a) Since an error in the period of the output clock signal caused by a fraction of the reference time which cannot be divided by the divided clock signal is corrected each time the accumulated value of the accumulator reaches a multiple of the frequency dividing parameter, error accumulation with repeated generation of the output clock signal is eliminated.

(b) Since the error is accurately corrected irrespective of the set period of the divided clock signal, error correction is facilitated by setting the frequency dividing parameter at a sufficiently large value even when a reference time for a plurality of time signals varies over a wide range.

A preferred clock signal generating device of the present invention is suitable for generating a clock signal for sampling image data from auto-focusing cameras and for digitizing charge storage periods of image sensors of the cameras. Focusing of the camera is improved as the clock signal generating device facilitates detecting images of subjects in high precision even when brightness and contrast of the subjects greatly change.

A preferred clock signal generating device of the present invention, which detects the shortest time indicated by a plurality of time signals as a reference time, simplifies the circuit configuration and reference time detection by adopting a simple logic gate for the reference time detector.

By feeding a common reference clock signal to the reference value counter and the output counter, the circuit configuration is further simplified. By adopting a programmable counter for the output counter, the circuit configuration is also simplified.

By configuring the accumulator with flip flops and adders, assigning a flip flop and an adder to each data bit, and feeding a carry output from an adder to the next-following adder, accurate error correction is facilitated and the circuit configuration is simplified. Also, by providing an adding circuit which adds 1 to the reference value of the reference value counter and feeds the result of the addition to the output counter, and by operating the adding circuit by the carry output from the accumulator, accurate error correction is facilitated and the circuit configuration is simplified.

We claim:

1. A clock signal generating device for generating a clock signal for chopping periods of time represented by a plurality of time signals, comprising:

a reference time detecting means for detecting a reference time from the time signals and for outputting a reference signal;

a frequency divide-and-counting means operatively coupled to the reference time detecting means, for counting a reference clock signal until the reference signal is generated and for outputting a divided clock signal obtained by dividing the reference clock signal with a predetermined frequency dividing ratio;

a reference value counting means operatively coupled to the frequency divide-and-counting means, for counting the divided clock signal and for storing a count value of the divided clock signal as a reference value;

an output counting means operatively coupled to the reference value counting means, for receiving the reference clock signal after the reference signal is generated, for counting the received reference clock signal, and for generating an output clock signal each time a count value of the received reference clock signal reaches a set value thereof;

an accumulating means operatively coupled to the output counting means, for accumulating, each time the output clock signal is generated, a count value of the reference clock signal of the frequency divide-and-counting means at a time of generation of the reference signal; and a set value renewing means operatively coupled to the output counting means, for renewing the set value of the output counting means to the reference value stored in the reference value counting means each time the output clock signal is generated, and for renewing the set value of the output counting means to a value obtained by adding 1 to a multiple of a set parameter of the frequency dividing ratio only when an accumulated value of the accumulating means reaches the multiple of the set parameter.

2. The clock signal generating device as claimed in claim 1, wherein the reference time detecting means detects a shortest period indicated by the time signals.

3. The clock signal generating device as claimed in claim 1, wherein the reference clock signal is commonly fed to the reference value counting means and the output counting means.

4. The clock signal generating device as claimed in claim 1, wherein the output counting means comprises a programmable counter.

5. The clock signal generating device as claimed in claim 1, wherein the accumulating means comprises:

flip flops, each thereof being operatively coupled in correspondence with one single corresponding bit of the accumulated value, for storing the accumulated value; and adders, each thereof being operatively coupled in correspondence with one single corresponding bit of the accumulated value, for receiving the stored accumulated value and the count value of the frequency divide-and-counting means, and each of the adders feeding carry output thereof to a next-following adder.

6. The clock signal generating device as claimed in claim 1, wherein the set value renewing means comprises an adding circuit, operated by output of the accumulating means, for adding 1 to the reference value of the reference value counting means.

7. An image read-out device comprising image sensor means for producing a plurality of time signals, quantize means operatively coupled to the image-sensor means for quantizing the time signals, clock means operatively coupled to the quantize means for clocking of the quantizing of the time signals, and clock signal generating means operatively coupled to the clock means for generating a clock signal, wherein the clock signal generating means comprises:

a reference time detecting means operatively coupled to the image sensor means for detecting a reference time from the time signals and for outputting a reference signal;

a frequency divide-and-counting means operatively coupled to the reference time detecting means, for counting a reference clock signal until the reference signal is generated and for outputting a divided clock signal obtained by dividing the reference clock signal with a predetermined frequency dividing ratio;

a reference value counting means operatively coupled to the frequency divide-and-counting means, for counting the divided clock signal and for storing a count value of the divided clock signal as a reference value;

an output counting means operatively coupled to the reference value counting means, for receiving the reference clock signal after the reference signal is generated, for counting the received reference clock signal, and for generating an output clock signal each time a count value of the received reference clock signal reaches a set value thereof;

an accumulating means operatively coupled to the output counting means, for accumulating, each time the output clock signal is generated, a count value of the reference clock signal of the frequency divide-and-counting means at a time of generation of the reference signal; and a set value renewing means operatively coupled to the output counting means, for renewing the set value of the output counting means to the reference value stored in the reference value counting means each time the output clock signal is generated, and for renewing the set value of the output counting means to a value obtained by adding 1 to a multiple of a set parameter of the frequency dividing ratio only when an accumulated value of the accumulating means reaches the multiple of the set parameter.

8. The image read-out device as claimed in claim 7, wherein the reference time detecting means detects a shortest period indicated by the time signals.

9. The image read-out device as claimed in claim 7, wherein the reference clock signal is commonly fed to the reference value counting means and the output counting means.

10. The image read-out device as claimed in claim 7, wherein the output counting means comprises a programmable counter.

11. The image read-out device as claimed in claim 7, wherein the accumulating means comprises:

flip flops, each thereof being operatively coupled in correspondence with one single corresponding bit of the accumulated value, for storing the accumulated value; and adders, each thereof being operatively coupled in correspondence with one single corresponding bit of the accumulated value, for receiving the stored accumulated value and the count value of the frequency divide-and-counting means, and each of the adders feeding carry output thereof to a next-following adder.

12. The image read-out device as claimed in claim 7, wherein the set value renewing means comprises an adding circuit, operated by output of the accumulating means, for adding 1 to the reference value of the reference value counting means.

* * * * *